United States Patent [19]

Chang

[11] Patent Number: 5,473,732
[45] Date of Patent: Dec. 5, 1995

[54] RELATIONAL ARTIFICIAL INTELLIGENCE SYSTEM

[76] Inventor: Hou-Mei H. Chang, 5113 Carolwood La., Durham, N.C. 27713

[21] Appl. No.: 385,087

[22] Filed: Feb. 7, 1995

Related U.S. Application Data

[63] Continuation of Ser. No. 146,996, Nov. 2, 1993, abandoned.

[51] Int. Cl.$^6$ .................................................. G06F 15/18
[52] U.S. Cl. .............................. 395/77; 395/50; 395/54; 395/60
[58] Field of Search ................................ 395/3, 11–12, 395/51, 54, 60, 67, 77, 900, 925

[56] References Cited

U.S. PATENT DOCUMENTS

| | | | |
|---|---|---|---|
| 4,935,876 | 6/1990 | Hanatsuka | 395/76 |
| 4,972,328 | 11/1990 | Wu et al. | 395/76 |
| 5,034,898 | 6/1991 | Lu et al. | 364/513 |
| 5,043,915 | 8/1991 | Suwa et al. | 395/52 |
| 5,107,499 | 4/1992 | Lirov et al. | 395/1 |
| 5,222,197 | 6/1993 | Tang et al. | 395/68 |
| 5,225,988 | 7/1993 | Barsa | 364/470 |
| 5,259,067 | 11/1993 | Kautz et al. | 395/67 |
| 5,263,126 | 11/1993 | Chang | 395/51 |
| 5,295,230 | 3/1994 | Kung | 395/75 |
| 5,325,465 | 6/1994 | Hung et al. | 395/77 |

OTHER PUBLICATIONS

Kiernan et al, "Compiling a rule database program into a C/SOL application"; Proceedings. Seventh International Conference on Data Engineering, pp. 388–395, 8–12 Apr. 1991.

Paul et al, "Rule management and inferencing in relational databases"; IEEE Proceedings of Southeastcon '19, pp. 695–697 vol. 2, 7–10 Apr. 1991.

Joseph et al, "A knowledge based subsystem for a natural language interface to a database that predicts and explains query failures"; Proceedings. Seventh International Conference on Data Engineering, pp. 80–87, 8–12 Apr. 1991.

Hsieh, "A logic to unify semantic network knowledge systems with object–oriented database models"; Proceedings of the Twenty–Fifth Hawaii International Conference on System Sciences, pp. 347–358 vol. 2, 7–10 Jan. 1992.

Han et al, "Data–driven discovery of quantitative rules in relational databases"; IEEE Transactions on Knowledge and Data Engineering, pp. 29–40 vol. 5 iss. 1, Feb. 1993.

Lim, "Semantic networks and associative databases"; IEEE Expert, pp. 31–40 vol. 7 iss. 4, Aug. 1992.

Cai, Yandong et al., 1991, in Piatetsky–Shapiro, et al. edit, Knowledge Discovery in Databases, AAAl Press, 213–228.

Chang, H. M., 1988, Inductive Learning with Exceptions, PhD Dissertation, University of Alabama at Huntsville.

Codd, E. F., 1990, The Relational Model for Database Mgmt. Addison–Wesley Publ. Co.

Kaufman, K. A. et al., 1991, Mining for Knowledge in Databases, in Piatetsky–Shapiro et al., edit Knowledge discovery in Databases, AAAl Press, 449–462.

(List continued on next page.)

*Primary Examiner*—David K. Moore
*Assistant Examiner*—Tariq Hafiz

[57] ABSTRACT

A relational artificial intelligence system is invented and developed. It comprises a relational automatic knowledge acquisition system and a relational reasoning system. The relational automatic knowledge acquisition system is a relational learning system which discovers knowledges from spreadsheet-formed databases and generates relational knowledge bases using inductive learning technique. The relational reasoning system is a relational knowledge-based system which reasons about the generated relational knowledge bases automatically and predicts what will happen under future data readings. The feature of this invention is that every component in this system is relational. Not only the database to be read and the knowledge base to be generated, but also the inductive engine and the inference engine are relational. In the whole reading, operating, and generating processes, data are organized in the spreadsheet-form, and hence the system works with high efficiency and speed.

8 Claims, 6 Drawing Sheets

OTHER PUBLICATIONS

Michalski, R. S., 1983, The Theory and Methodology of Inductive Learning, Michalski et al., edit An Artificial Intelligence Approach., Tioga, 83–134.

Quinlan, J. R., 1990, Learning Logical Definitions from Relations, Machine Learning, 5, 239–266.

Rubin, S. H.,1993, Machine Learning and Expert systems, Al Expert, 1993, No. 6, 32–37.

Carbinell, J. G., 1989, Introduction: Paradigms fo Machine Learning, Artificial Intelligence, 40, 1–9.

Frawley, W. J. et al., 1992, Knowledge Discovery in Databases, Al Magazine (13)3, 57–70.

Frawley, W. J., et al., 1991, Knowledge Discovery in Databases, in Piatetsky–Shapiro et al., edit, Knowledge deic. in Databases, AAAl Press.

Shelfridge, O. G., The Garden of Learning, Al Magazine, (14) 2, 36–48.

RELATIONAL ARTIFICIAL INTELLIGENCE SYSTEM

This is a continuation of application Ser. No. 08/146,996, filed Nov. 2, 1993, now abandoned.

BACKGROUND OF THE INVENTION

The present invention relates generally to artificial intelligence system and particularly to the field of digital computer-aided knowledge acquisition and reasoning system. The system developed is called the Relational Artificial Intelligence System (RAIS). RAIS comprises a relational automatic knowledge acquisition system and a relational reasoning system. The relational automatic knowledge acquisition system is a relational learning system (RLS) and the relational reasoning system is a relational knowledge-based system (RKBS). Therefore the background of both learning system and knowledge-based system needs to be discussed here.

The knowledge-based system (KBS) also called the expert system is one of the most successful branches in Artificial Intelligence (AI), and has been successfully applied in different areas, such as engineering, business, medicine, etc. Currently, most KBSs are created by using expert system shells, and this simplifies the process of building expert systems. In most of current expert system shells, the inference engine is built-in, so the creation of an expert system in any domain is simplified to the creation of a knowledge base in the specific domain.

The built-in inference engine is a computer program. It can reason about the knowledge base in the required format. There are three most frequently used types of knowledge bases: rule-based, frame-based, and predicate expressions.

Among these three types, the rule-based knowledge base is the most commonly used. Rule-bases are built by the cooperation of domain experts and knowledge engineers who are software engineers familiar with the structures and requirements of expert systems and expert system shells. Generally speaking, the "if-then" rules or frames of knowledge bases are totally different from any knowledge representation formats in domain experts' professional or daily life. Domain experts need the help of knowledge engineers in the process of design and creation of any knowledge bases. Before being executed, the created knowledge base needs to be compiled and integrated with the inference engine.

The cooperation of domain experts and knowledge engineers is the most time-consuming, and maybe the most cost-consuming process. And it is the most difficult part in building expert systems. Since 70's, it is believed that the process, which involves domain experts and knowledge engineers working together to design, construct, and modify the domain knowledge base, is the main bottleneck in the development of expert systems.

There are two different ways to solve the above-mentioned bottleneck problem:

The first one is to make the system acquire knowledge automatically by itself. To acquire knowledge from data readings or databases directly is one of the most important research areas. Most current databases are relational or object-oriented, i.e., they are spreadsheet-formed, but most current knowledge bases are rule-based or frame-based. It's no easy task taking spreadsheet-formed databases as sources, and rule-formed or frame-formed knowledge bases as output targets at the same time through the learning system. Up to now, no big success in this area has been achieved.

The second one is to make the KBS user-friendly such that domain experts can input domain knowledge by themselves. Some authors developed spreadsheet-formed interfaces between the user and the rule-based KBS. However, because their knowledge bases are still rule-based, such systems are either designed for specific domains or not homogeneously integrated. Moreover, compilation and integration for such systems are still necessary after knowledge is inputted or modified.

SUMMARY OF THE INVENTION

Figure 1:
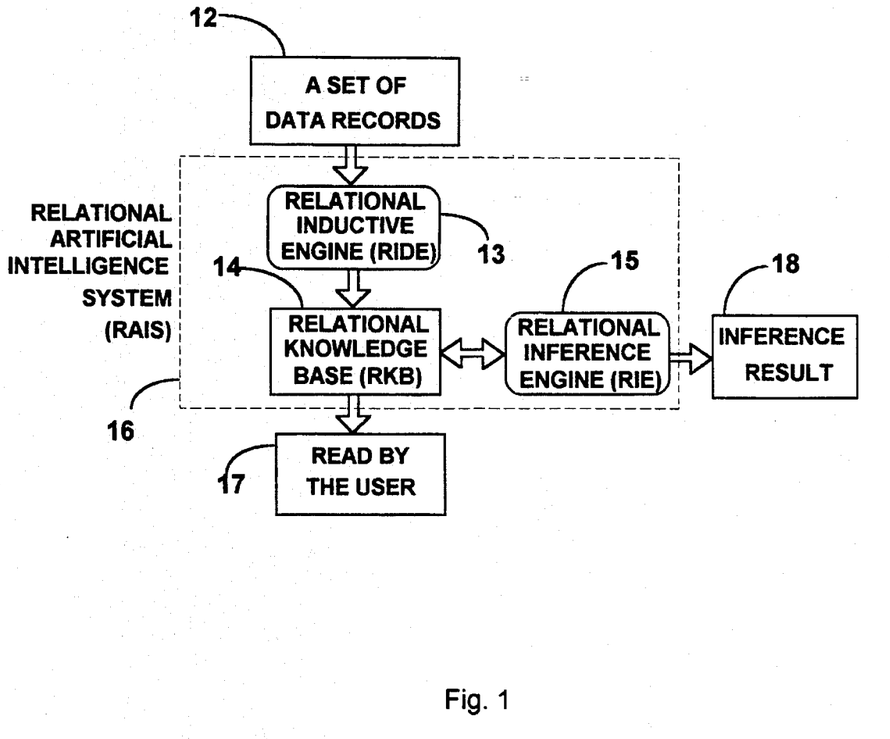
FIG. 1 is a schematic diagram showing the main parts of the invented Relational Artificial Intelligence System (RAIS).

RAIS comprises a relational automatic knowledge acquisition system and a relational reasoning system. The relational automatic knowledge acquisition system is a relational learning system. Its main part is a relational inductive engine (RIDE) which is a built-in computer executable program for discovering knowledge from a set of data records (e.g., spreadsheet-formed databases) and storing the discovered knowledge in a spreadsheet-formed knowledge base called relational knowledge base (RKB). The relational reasoning system is a relational knowledge-based system and comprises a relational inference engine (RIE) and a spreadsheet-formed knowledge base generated by the RIDE. The RIE is a built-in computer executable program and can reason about any spreadsheet-formed knowledge base automatically; no programming, compilation, or integration is necessary. The structure of RAIS is shown in FIG. 1.

Figure 2:
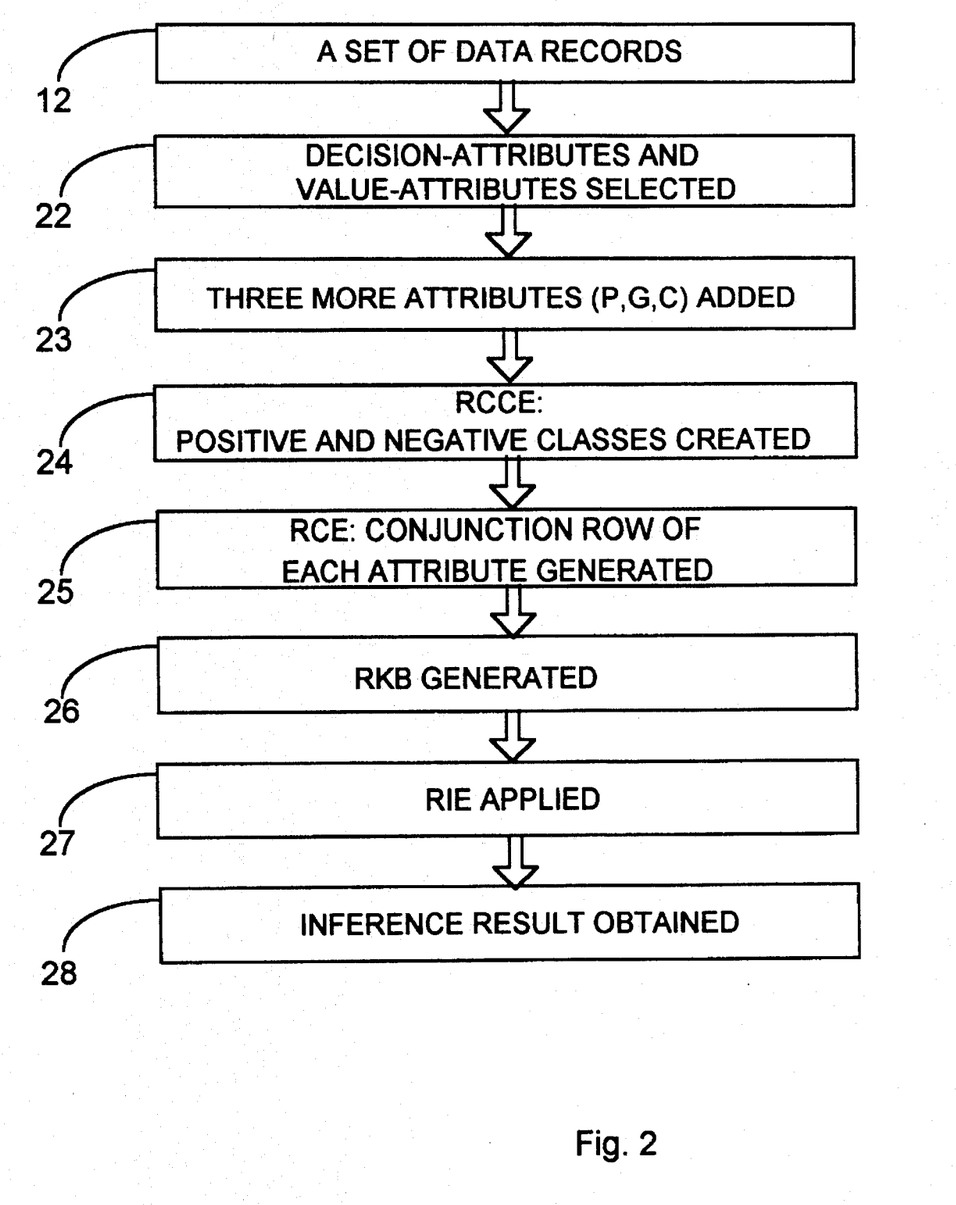
FIG. 2 shows the working process of the RAIS.
Figure 3:
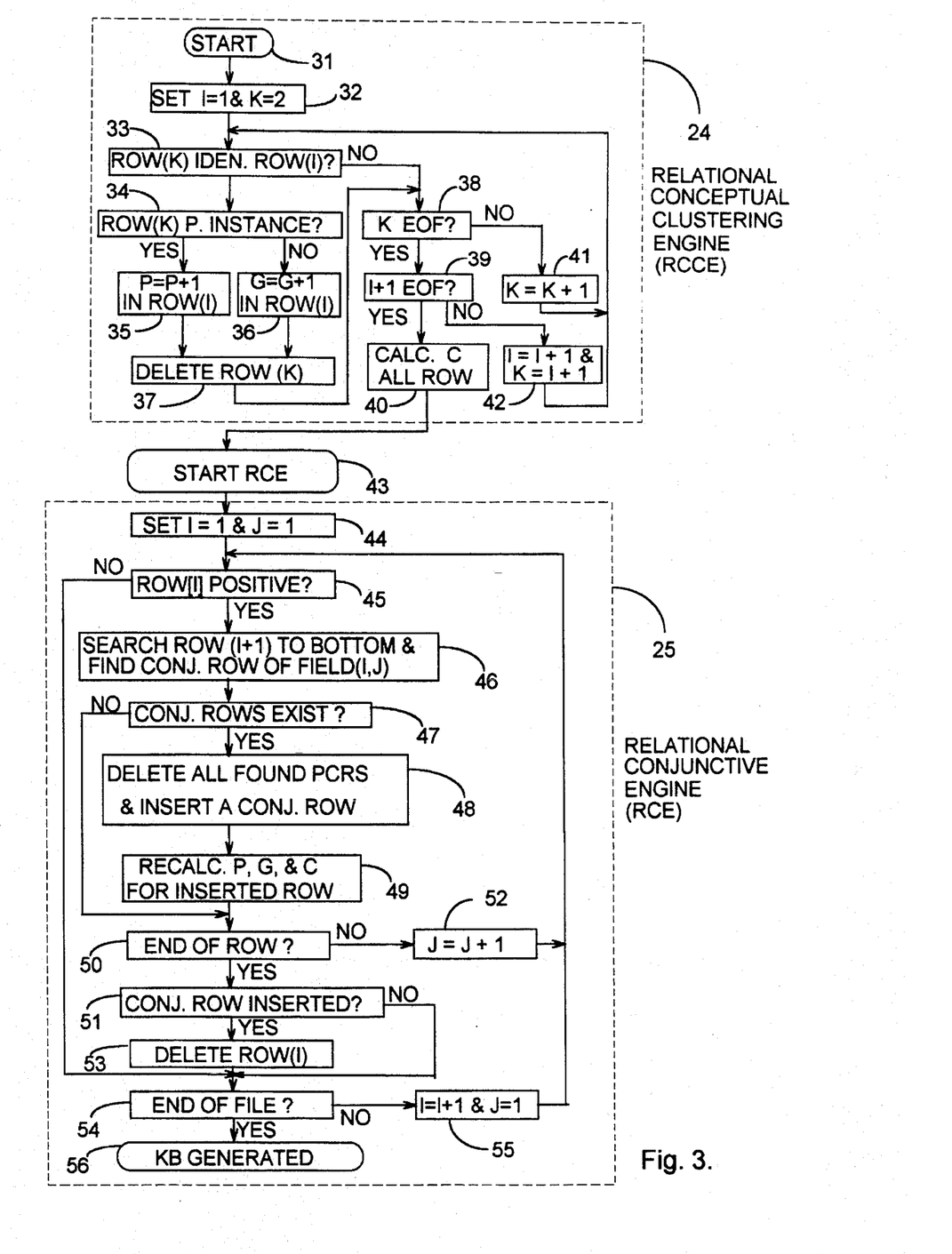
FIG. 3 is the flowchart of the RLS.

The RIDE comprises two main parts: the relational conceptual clustering engine (RCCE) which performs the relational conceptual clustering process, and the relational conjunctive engine (RCE) which performs the relational conjunctive generalization process as shown in FIG. 2 and FIG. 3.

The relational automatic knowledge acquisition system and the relational reasoning system can exist and work independently as a relational learning system (RLS) and a relational knowledge-based system (RKBS). Such as, the RKB obtained by the RLS can be used directly by the user. And the RKB obtained by some other methods, such as being entered by the user interactively, still can be reasoned by the RIE.

Although both RLS and RKBS can exist and be operated independently, the most interesting part of this invention is that they can be operated as a whole system which can read data from a database, generate a RKB, and give predictions under future readings by reasoning about the generated RKB.

An example of automatic knowledge acquisition from a database is given in Tables 1–5. In this example, a relational database of six attributes and twenty-four records is taken as the source database. In the given database, three attributes are selected as value-attributes and a single attribute is selected as the decision-attribute. After relational inductive learning, a RKB of two rows is generated. These two rows correspond to a knowledge base with two rules.

DESCRIPTION OF THE INVENTION

1. Database relations and decisions relations. In relational or object-oriented database systems, data are stored in files which are represented in the spreadsheet-formed structure and called relations by the RDBMS' terminology. The theoretical basis of relations in the RDBMS was established by Codd, but no concept of relations in learning system and knowledge-based system has been introduced yet. The relational concept of learning system and knowledge-based system is introduced by the applicant in this invention. The relations used in DBMS are called database relations, and the relations used in the invented RLS and RKBS are called decision relations (DR) and knowledge relations (KR) respectively.

Each relation has a set of attributes and a set of rows. In a database relation, all attributes are treated equally. But in a decision relation the concept of different sets of attributes is introduced, which is a generalization of Codd's definition of relations.

In RLS, one or more attributes are used as the class label to classify different classes. In RKBS, one or more attributes are used to store decisions (or called actions) that have to be made under given conditions. These attributes are different from the regular attributes in database relations and are called decision-attributes.

2. Definition of decision relations. Each decision relation (DR) is a relation having two different sets of attributes: a set of value-attributes and a set of decision-attributes. Each field can take a value from its value-list, which is called domain of the attribute in database theory. Fields in value-attributes are called value-fields; fields in decision-attributes are called decision-fields. Values in decision-fields are called decision statements or decision-values. And the difference between the value-attribute and the decision-attribute can be found in their different functions in the working processes of RLS and RKBS discussed below.

3. Decision relations in RLS. In RLS, the state of an instance is determined by values in all value-fields of this instance which is a row in the decision relation, and the class the instance belonging to is determined by decision-values in this instance. In case values in all value-fields of two instances are equal, these two instances are defined in the same state. In case all decision-values in two instances are equal, these two instances are defined in the same class. In each learning process, if the decision-values of an instance (a row) are equal to some given values, this instance (row) is defined as a positive instance, otherwise, it is defined as a negative instance.

The learning process is to find out the most general rules to discriminate positive instances from negative instances. These rules in RLS are expressed by values in all value-attributes of a decision relation. And so, the learning process is to find out the most general form of values in all value-attributes of a decision relation that discriminates positive instances from negative instances. The method of performing this task is using relational clustering and conjunctive generalization technologies to find out conjunction rows.

4. Knowledge relations in knowledge bases. A knowledge base comprises a set of knowledge relations. Knowledge relations are decision relations having some more features, and are used in knowledge-based systems. In a knowledge relation the ideas of status factor of each value-field and the status factor of each row are introduced. Each value-field not only can store a value selected from its value-list but also has a status factor. If the value in a value-field matches a given value, the status factor of the value-field is true, otherwise it is false. If the status factors of all value-fields in a row are true (or non-false), the status factor of the row is true (or in short, we say the row is true); if the status factor of any value-field in a row is false, this row is false. Once a row is proved true, it will be fired, that means all decision statements in this row will be executed. To execute a decision statement is to perform a decision. The decision can be a text description to be displayed on the computer screen, a formula to be calculated, a computer program to be executed, another knowledge relation to be opened, starting a machine, and/or any program designed by the user.

5. Attribute selection. Before the learning process is started, one or more attributes in the set of data records to be read are selected as decision-attributes to classify all instances in this relation into positive instances and negative instances. Other interested attributes (all or a part of the remaining attributes) are selected as value-attributes. If the learning-from-examples technique is used, a sequence of decision-values, in which each one is selected from a different decision-attribute respectively, will be selected by the user as classification-decision-values to decide the positive instances. And once the selection is made, it will not be changed any more in the whole process until a knowledge base is generated. The selected value-attributes and the selected decision-attributes for the RLS will be the value-attributes and the decision-attributes of the knowledge relation in the generated RKB respectively.

In learning-from-observations problems, the above processes can be performed repeatedly, that means different decision-values in decision-attributes can be selected as classification-decision-values by the system. After learning for all possible combinations of selections, the final results will be obtained.

6. Identical rows. Two rows in the same decision relation are defined identical if and only if values in all value-fields of these two rows are identical. And the second row is called the identical row of the first one.

7. Three additional attributes. Three additional attributes: p, g, and C are added to the decision relation before the inductive learning process is started. The positive count p is used to count how many times the identical instances appear as positive instances; the negative count g is used to count how many times the identical instances appear as negative instances; and the certainty factor C is a function of p and g calculated for expressing how often the instance will appear as a positive instance. One of the formulas to define the function C is:

$$C=p/(p+g). \tag{1.1}$$

8. Conceptual clustering and threshold condition. In the conceptual clustering process, all rows of the same state in the database relation are combined into a single row. And p and g are used to count its appearances as positive instance and negative instance respectively. And C can be calculated from p and g by formula (1.1).

The threshold condition used to classify rows after clustering is expressed by the following expression:

$$C>=T \tag{1.2}$$

where the threshold T is given by the user. After conceptual clustering, any row satisfying condition (1.2) can be considered as a positive row; otherwise will be a negative row.

9. Relational conjunctive generalization (RCG). RCG is performed by the relational conjunctive engine (RCE). Many inductive generalization rules developed by Michalski and the inventor of the present invention can be performed by the RCE in a single process. The process is discussed below.

10. Seed row and seed field. In order to do RCG, the ideas of seed field and seed row are introduced. Take a positive row of a decision relation as the seed row, and a value-field in the seed row as the seed field. The value in the seed field of the seed row is called the seed value or simply the seed.

Any positive row that has the same values in all value-fields as the seed row except the seed field is called the potential conjunction row (PCR). If values in the seed fields of all PCRs form a conjunction of the seed value, then a conjunction row of the seed row can be created. The conjunction row of the seed row is a row in which all value-fields have the same values as those in the seed row except the seed field, in which a conjunction of the seed value is stored. A conjunction row is more general than the seed row and all of its PCRs. Therefore the conjunction row can be served as a substitute of all such rows.

11. Total conjunction row and partial conjunction row. If all values in the value-list of the seed field are included in different PCRs of the seed row, a blank (or N/A) which means "don't care" can be written in the seed field of the conjunction row. This is the most general conjunction for a seed field in a seed row, and is called the total conjunction of the seed row.

If only a part of values in the value-list of the seed field is included in all PCRs of the seed row, and these values satisfy a given condition (such as more than five values in the value-list are found etc.), then a partial conjunction row can be obtained. In the partial conjunction row, values in all value-fields are the same as those in the seed row except the value in the seed field. In the seed field, only a part of values in the value-list is included. This partial list can be expressed by a single symbol which will be written in the seed field in the partial conjunction row. The partial conjunction corresponds to the "climbing generalization tree rule" in papers written by Michalski and by Chang.

12. Threshold condition for positive count. The RCE will find out the conjunction rows for every existing row, and retain all rows that satisfy two threshold conditions, the formula (1.2) and the following formula:

$$p >= P_{min} \tag{1.3}$$

where the thresholds T in (1.2) and $P_{min}$ in (1.3) are given by the user. The generated decision relation is a knowledge relation in the RKB. If only a single database relation is involved, the generated decision relation (the knowledge relation) is the generated RKB in which all knowledge discovered from the database is stored.

13. Relational inference engine (RIE). The RIE is a built-in computer program which scans every value-field of a knowledge relation and performs a true/false test of each value-field by querying. If a value-field is not empty (i.e., it is not "don't care") and the response regarding the attribute can't be found from the computer memory, then a querying process will be performed. In the querying process, RIE queries the environment to obtain a response, and the response from the environment will be stored in the computer memory. The response from the environment can be obtained from the user interactively, from databases, from sensors, from other programs, or from any other means depending on the design of the application. If the value in the value-field matches the response regarding the attribute, the status factor of the value-field is defined true; if it mismatches the response, the status factor of this value-field is defined false.

If the status factor of any value-field in a row is false then the row is defined false; if at least one value-field in a row is true and all others are non-false (true or blank), then the row is defined true. If any row of a knowledge relation is proved true then all decision statements in this row will be executed.

14. An example.

The following tables show a material test database as an example. Table 1 is the database relation of the test result. The attributes are "Date," "Sample #," "Diameter," "Temperature," "Pressure," and "Result." Data of twenty-four test results are shown in the relation as twenty-four instances.

In order to do inductive learning, a decision relation is created and clustered as shown in Table 2. In the decision relation, the attribute "Result" is selected as the decision-attribute, and all instances having the value "Success" in the decision-attribute are defined as positive instances, and all others are defined as negative instances. Only "Diameter," "Temperature," and "Pressure" are selected as the value-attributes by the user, and attributes "Date" and "Sample #" are not selected as shown in Table 2.

Moreover, three additional attributes p, g, and C (the positive count, the negative count, and the certainty factor) are added in Table 2. After clustering by the RLS, twenty-four rows in Table 1 are simplified to twelve rows as displayed in Table 2, such as row-1 in Table 2 includes two positive instances (p=2), and row-8 includes three positive instances and a negative instance (p=3 and g=1). In each row, C is calculated by formula (1.1). The threshold is taken as T=0.75 by the user, and the threshold condition (1.2) is applied to the decision relation shown in Table 2. All rows in Table 2 with C>=0.75 can be considered as "Success" and retained, and all others are considered "Failure" and deleted. The generated decision relation is shown in Table 3.

TABLE 1

A Database Relation of The Material Test

| Date | Sample # | Diameter | Temperature | Pressure | Result |
|---|---|---|---|---|---|
| 5/11/93 | 1 | 10 | 500 | Low | Success |
| 5/11/93 | 2 | 10 | 500 | Medium | Success |
| 5/11/93 | 3 | 10 | 500 | High | Failure |
| 5/11/93 | 4 | 10 | 800 | Low | Failure |
| 5/11/93 | 5 | 10 | 800 | Medium | Failure |
| 5/11/93 | 6 | 10 | 800 | High | Failure |
| 5/11/93 | 7 | 10 | 500 | Low | Success |
| 5/11/93 | 8 | 10 | 500 | Medium | Success |
| 5/11/93 | 9 | 10 | 500 | High | Success |
| 5/14/93 | 10 | 15 | 500 | Low | Success |
| 5/14/93 | 11 | 15 | 500 | Medium | Success |
| 5/14/93 | 12 | 15 | 500 | High | Failure |
| 5/14/93 | 13 | 15 | 800 | Low | Failure |
| 5/14/93 | 14 | 15 | 800 | Medium | Failure |
| 5/14/93 | 15 | 15 | 800 | High | Failure |
| 5/14/93 | 16 | 15 | 500 | Low | Success |
| 5/14/93 | 17 | 15 | 500 | Medium | Failure |
| 5/14/93 | 18 | 15 | 500 | High | Failure |
| 5/15/93 | 19 | 15 | 500 | Low | Success |
| 5/15/93 | 20 | 15 | 500 | Medium | Success |
| 5/15/93 | 21 | 15 | 500 | High | Success |
| 5/16/93 | 22 | 15 | 500 | Low | Success |
| 5/16/93 | 23 | 15 | 500 | Medium | Success |
| 5/16/93 | 24 | 15 | 500 | High | Failure |

TABLE 2

The Decision Relation after Clustering

| Value Attribute | | | Decision Attribute | | | |
|---|---|---|---|---|---|---|
| Diameter | Temperature | Pressure | Result | p | g | C |
| 10 | 500 | Low | Success | 2 | 0 | 1.0 |
| 10 | 500 | Medium | | 2 | 0 | 1.0 |
| 10 | 500 | High | | 1 | 1 | 0.5 |
| 10 | 800 | Low | | 0 | 1 | 0 |
| 10 | 800 | Medium | | 0 | 1 | 0 |

TABLE 2-continued

The Decision Relation after Clustering

| | Value Attribute | | Decision Attribute | | | |
|---|---|---|---|---|---|---|
| Diameter | Temperature | Pressure | Result | p | g | C |
| 10 | 800 | High | | 0 | 1 | 0 |
| 15 | 500 | Low | | 4 | 0 | 1.0 |
| 15 | 500 | Medium | | 3 | 1 | 0.75 |
| 15 | 500 | High | | 1 | 3 | 0.25 |
| 15 | 800 | Low | | 0 | 1 | 0 |
| 15 | 800 | Medium | | 0 | 1 | 0 |
| 15 | 800 | High | | 0 | 1 | 0 |

In Tables 2–5 each row may express more than one instance, and may contain several positive instances (counted by p) and several negative instances (counted by g). The "Result" field for each row become meaningless except C=1 (for "Success") or C=0 (for "Failure"). Therefore, the "Result" fields are empty for all rows except the first row. And the certainty factor C calculated from its corresponding p and g is a measure of the certainty of the row to be positive. In the first row, the "Success" indicates that rows which have decision statement equal to "Success" in Table 1 are taken as positive instances.

TABLE 3

The Decision Relation after Threshold Condition Applied

| | Value Attribute | | Decision Attribute | | | |
|---|---|---|---|---|---|---|
| Diameter | Temperature | Pressure | Result | p | g | C |
| 10 | 500 | Low | Success | 2 | 0 | 1.0 |
| 10 | 500 | Medium | | 2 | 0 | 1.0 |
| 15 | 500 | Low | | 4 | 0 | 1.0 |
| 15 | 500 | Medium | | 3 | 1 | 0.75 |

TABLE 4

The Generated Relational Knowledge Base

| | Value Attribute | | Decision Attribute | | | |
|---|---|---|---|---|---|---|
| Diameter | Temperature | Pressure | Result | p | g | C |
| | 500 | Low | Success | 6 | 0 | 1.0 |
| | 500 | Medium | | 5 | 1 | 0.83 |

TABLE 5

The Generated Relational Knowledge Base after One More Conjunctive Generalization

| | Value Attribute | | Decision Attribute | | | |
|---|---|---|---|---|---|---|
| Diameter | Temperature | Pressure | Result | p | g | C |
| | 500 | Not High | Success | 11 | 1 | 0.92 |

After conjunctive generalization, a knowledge relation in the generated RKB containing two total conjunction rows shown in Table 4 is generated. In these two rows, the fields in the diameter column are blank because the conjunctive generalization principle is applied. This means the diameter has no effect on the result, and hence we can say that both fields in attribute "Diameter" have the value "don't care."

Each row in Table 4 corresponds to a rule, and these two rows (rules) can be translated to English as:

Rule 1: If temperature=500, and Pressure=Low (Diameter="don't care") Then the sample test will succeed, with the certainty factor C=1.0.

Rule 2: If temperature=500, and Pressure=Medium (Diameter="don't care") Then the sample test will succeed, with the certainty factor C=0.83.

The conjunctive generalization principle can be applied one more time in Table 4, and the RKB (expressed as a single-rowed knowledge relation) shown in Table 5 is generated, where the two rows are combined into a single row by a partial conjunction. This single row (rule) can be translated to English as:

Rule 3: If temperature=500, and Pressure=NOT High (Diameter="don't care") Then the sample test will succeed, with the certainty factor C=0.92.

The generated relational knowledge base shown in Tables 4 and 5 can be read by the user directly, reasoned by a RIE, or entered into any expert system shells.

In this example the data source is the database shown in Table 1. If data are obtained from sensors or other interfaces, the whole or a part of the obtained data can be selected as input data and can be either stored in an existing DBMS or read by the RLS directly.

15. The relation of code. In order to speed up the learning process and save memory, a code can be assigned to the value in each field. In a relation, each attribute has a set of permissible values called the value-list or the domain of the attribute. The value-lists of all attributes (including value-attributes and decision-attributes) in a decision relation are stored in an attribute-value table (AVT).

Figure 4:
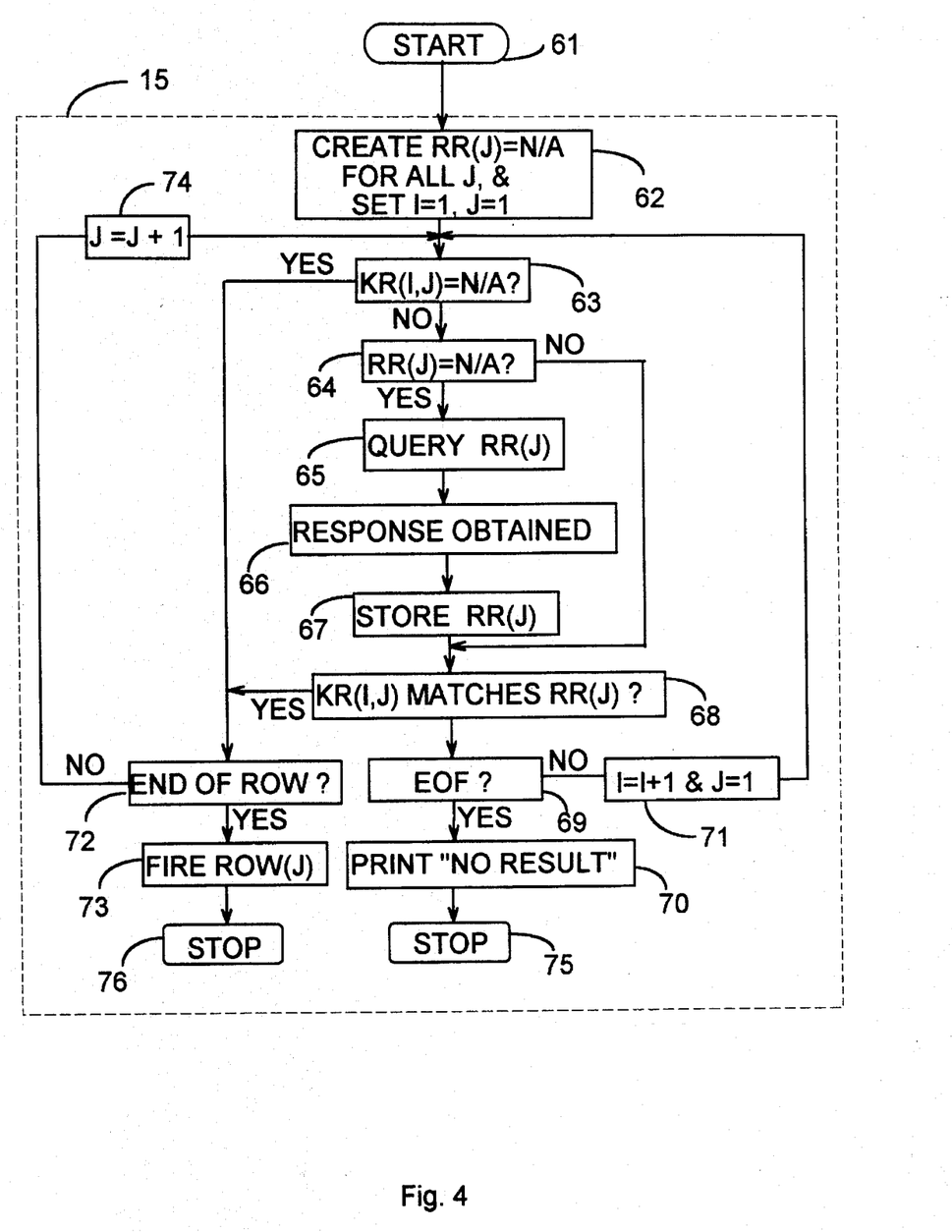
FIG. 4 is the flowchart of the RIE.

A code can be assigned to each value in the value-list, such as the sequence number of each permissible value in the value-list can be assigned as its code. A code can be thought as a pointer of the value. A relation can be transferred to a relation of code by transferring the value in each field to its code. Thus the user can work on the relation of code instead of the original relation. No matter how complicated a value in a relation is, its code can be assigned as an integer (a sequence number is always an integer) or a character. Therefore a relation of code will be an array of integers. And the searching process will run much faster in the relation of code than in the original relation comprising character strings. It is obvious that a relation of code can be transferred back to the original relation of value at any time by the transfer engine taking the AVT as a dictionary. The working process using codes is shown in FIG. 4.

DETAILED DESCRIPTION OF DRAWINGS

FIG. 1 shows a schematic diagram of the RAIS. Block 16 is the RAIS invented by the applicant. In RAIS, the RIDE 13 reads data from "A Set of Data Records" 12 and generates a RKB 14. "A Set of Data Records" 12 can be readings obtained repeatedly from a set of sensors and/or other instruments, a spreadsheet-formed database, or some others.

The RKB 14 can be reasoned by the RIE 15 generating the inference result 18, or read by the user directly as shown in block 17.

FIG. 2 shows the working process of the RAIS. The system starts to read data from a set of data records. If the readings of the set of data records are stored in the computer storage, they can be represented in a spreadsheet-formed structure in a file in the computer storage and called the database relation.

Decision-attributes and value-attributes are selected from the set of data records by the user to create a decision relation in block 22. At the same time, decision statements are selected by the user. If the decision statements in an instance are equal to some selected values, the instance is defined as a positive instance; otherwise it is defined as a negative instance.

Block 23 shows that three more attributes p, g, C are added to the created decision relation, where p and g are the positive count and the negative count of an instance. Two instances having the same values in all value-attributes are called identical instances. All identical instances are grouped in a single row, therefore the positive count p and the negative g are needed. C is the certainty factor and can be calculated from p and g.

Blocks 24 and 25 are the main parts of the relational inductive engine. Block 24 is the RCCE. It groups all identical rows in a single row, and uses p and g to record how many times the row appears as a positive instance and as a negative instance respectively. Block 25 is the RCE. Its function is to find out the conjunction (if exists) of each value-field of each row. And this is the relational induction. Both blocks 24 and 25 will be discussed in FIG. 3 in more detail.

After relational conjunctive generalization technique is applied, a RKB is generated as shown in block 26. The RKB can be either read by the user directly or reasoned by the RIE as shown in block 27. If the RIE is applied to the RKB, after the querying process, the inference result will be obtained in block 28.

FIG. 3 shows the flowchart of the RLS which comprises a RCCE and a RCE. RCCE (block 24) starts from block 31, initiates i=1 and k=2 in block 32, and then goes to block 33. In block 33, the system looks for identical rows of row(i) from the next row to the bottom. If row(k) is identical with row(i) in block 33, then the system checks the values in its decision fields to classify it in block 34. If row(k) is a positive instance, the system sets p=p+1 in row(i) in block 35, otherwise sets g=g+1 in row(i) in block 36, and deletes row(k) in block 37.

Blocks 38–42 form a block group, which is used to decide which row will be the next working row. If row(k) is not the bottom row, then the system sets k=k+1 and goes to the next row(k). If row(k) is the bottom row, then the system sets i=i+1 and k=i+1 and goes to the next row(i). If row(i) is the second row from the bottom, then the system calculates certainty factor C for all rows in block 40 and goes to RCE (block 25).

If row(k) is not identical with row(i) in block 33, then the system bypasses blocks 34–37 and goes to blocks 38–42 directly to decide the next row as described in the last paragraph.

RCE (block 25) starts from block 43, and initiates i=1 and j=1 in block 44. RCE takes field(i,j) as the seed field and looks for its potential conjunction rows from the next row down to the bottom in block 46 if row(i) is a positive row; otherwise goes to the next row directly as tested in block 45. If a conjunction row is found from all found potential conjunction rows in block 47, then RCE inserts a conjunction row right after the seed row in block 48. The inserted conjunction row has the same values in all value-fields as the seed row except the seed field, in which the conjunction of the seed value is stored. And RCE recalculates p, g, and C for the inserted conjunction row in block 49. P has an increment for each found potential conjunction row (PCR) if it is a positive instance; and g has an increment for each found potential conjunction row (PCR) if it is a negative instance. And C will be recalculated based on the new p and g. Then system goes to block 50. If the answer is "no" in block 47, then the system bypasses blocks 48 and 49 and goes to block 50 directly.

Blocks 50–56 form a block group, which is used to decide the next seed field. If it is not EOR (end of row) in block 50, then the system sets j=j+1 in block 52 and goes back to block 46, that means taking the next field of the same row as the seed field. If it is EOR in block 50, the seed field is the last value-field of the row. Therefore RCE checks and finds out if a conjunction row of any field has been inserted. If one or more inserted conjunction row of the seed row(i) is found, then the system deletes the original seed row(i) in block 53 and goes to block 54, because the inserted conjunction row is more general and includes the original row(i); otherwise the system goes to block 54 directly. In block 54, EOF is tested. If it is not EOF, then the system goes to block 55 and sets i=i+1, and j=1, that means taking the first field of the next row as the seed field and returns to block 46. If EOF is found in block 54, then the conjunctive generalization process is completed, and a RKB is generated.

A RKB is generated by the RLS and stored in the computer storage. The RIE will read the RKB and reason about it to generate the inference result. The working process of RIE is shown in FIG. 4.

In FIG. 4, the knowledge relation in the RKB is expressed by KR(i,j). KR is read first, and a temporary response relation RR is created, which is a single-rowed KR and has the same value-attributes as the KR but has no decision-attributes. All fields of RR are initiated to N/A, and i and j are initiated to 1 in block 62.

The RIE scans each value field of KR(i,j), and tests if it is N/A in block 63. If it is not N/A, then RIE tests if RR(j) is N/A in block 64; otherwise goes to block 72 to test EOR directly. If RR(j) is N/A in block 64, then RIE proceeds to do the querying process in blocks 65–67; otherwise bypasses the querying process and goes to block 68 directly. In the querying process, RIE queries the environment about RR(j) in block 65, obtaining the response from the environment in block 66, and storing the response into RR(j) in block 67. After the querying process, RIE checks if KR(i,j) matches RR(j) in block 68. If KR(i,j) doesn't match RR(j), this row is false, and then EOF is checked in block 69. If it is EOF, then all rows are false, and there is no result. Therefore the system prints "No Result" in block 70 and stops in block 75; otherwise, RIE will work on the next row. In order to go to the next row, RIE sets i=i+1 and j=1 in block 71 and goes back to block 63 to repeat the whole process mentioned above.

If KR(i,j) matches RR(j) in block 68, then this field is true, and EOR will be tested in block 72. If it is not EOR, RIE goes to work on the next field of the same row. Therefor RIE sets j=j+1 in block 74 and goes back to block 63 and repeats the whole process; if it is EOR, then this row is true and is the required result, and will be fired in block 73. The inference result is obtained, and the system stops in block 76.

Figure 5:
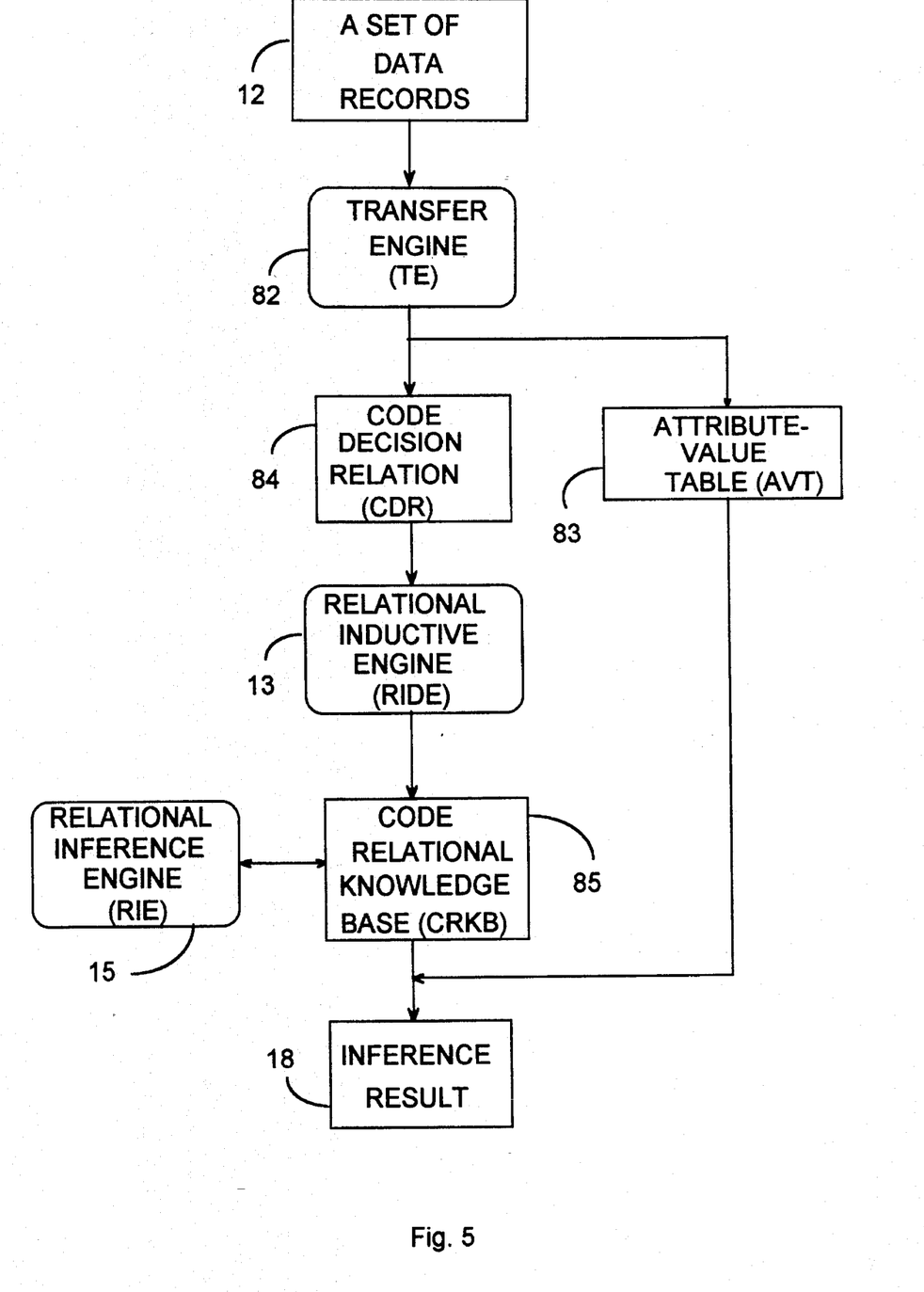
FIG. 5 is the block diagram illustrating the operations of RAIS using the code instead of the value in each field.

FIG. 5 shows the block diagram of the RAIS where codes of values are introduced to replace the complicated values in the database relation and the decision relation. Using short codes can save memory and speed up the process. A transfer engine (TE) in block 82, which is a built-in computer program, transfers the received data records (e.g., a database relation) 12 to the code decision relation 84 and the attribute-value table (AVT) 83. AVT 83 can be served as a dictionary in the translation, because all values and their corresponding codes for each attribute are stored in it. The RIDE 13 will generate the code relational knowledge base (CRKB) 85 by inductive learning technique from the CDR 84. The RIE 15 reasons about the generated CRKB 85 and generates the inference result 18.

Figure 6:
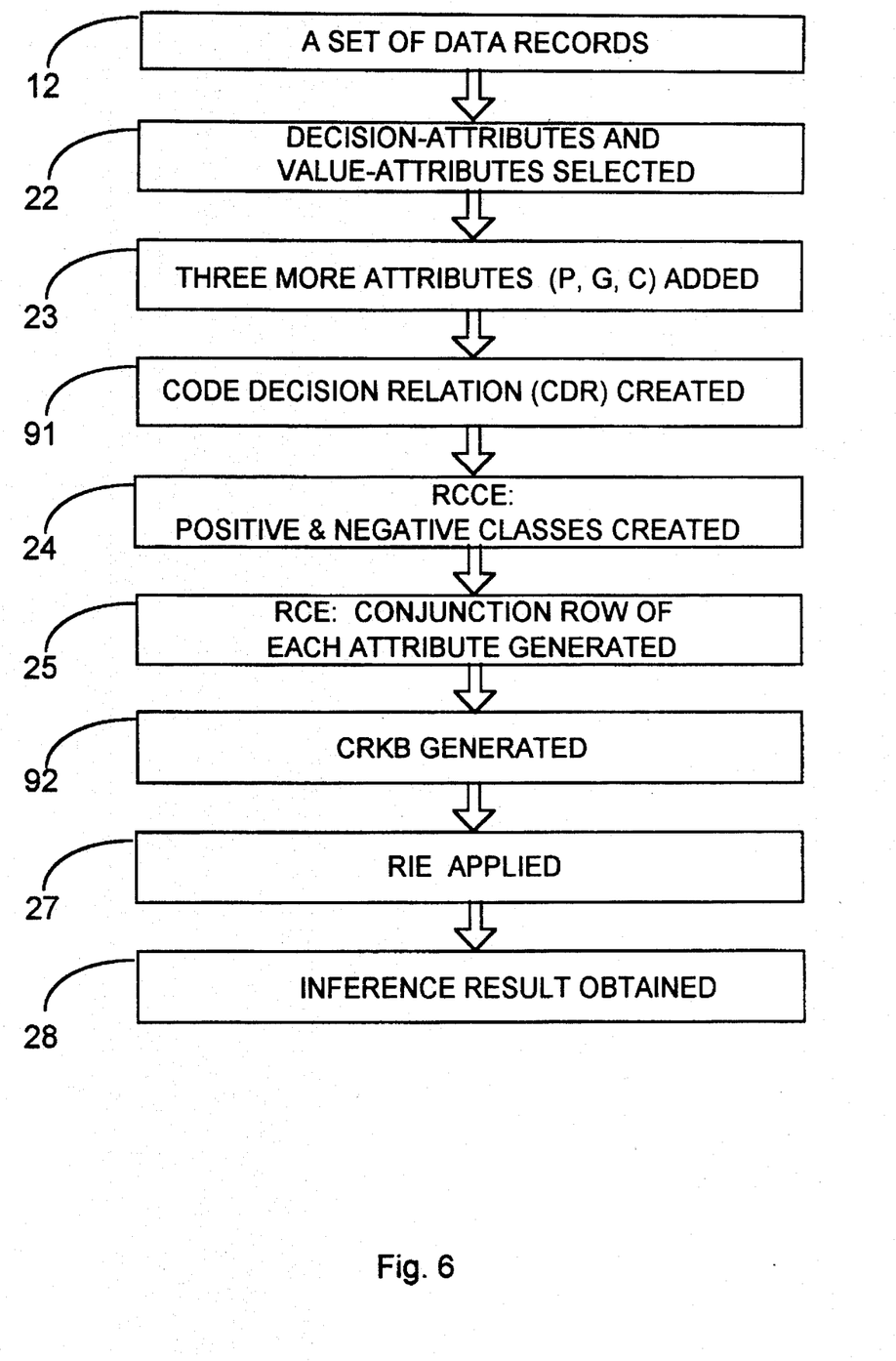
FIG. 6 shows the working process of the RLS and RIE using the code instead of the value in each field.

FIG. 6 shows the working process of RLS and RIE in which codes of values are introduced. FIG. 6 is similar to FIG. 2 except that blocks 91 and 92 are introduced in FIG. 6. After a decision relation is obtained and additional attributes p, g, C are added in blocks 22 and 23, a code decision relation (CDR) is created in block 91 by the TE. In each field of the CDR the value is transferred to its code by the TE. Then the RCCE and the RCE in blocks 24 and 25 will perform the relational conceptual clustering and the relational conjunctive processes to generate the CRKB 92. CRKB 92 is a code relational knowledge base in which the code of value is in each field instead of the value itself. The RIE 27 can reason about the CRKB and generate the inference result in block 28.

ACRONYM

AVT: Attribute-Value Table
CDR: Code Decision Relation
CRKB: Code Relational Knowledge Base
DR: Decision Relation
EOF: End of File
EOR: End of Row
KR: Knowledge Relation
PCR: Partial Conjunction Row
RAIS: Relational Artificial Intelligence System
RCCE: Relational Conceptual Clustering Engine
RCE: Relational conjunctive Engine
RCG: Relational Conjunctive Generalization
RDBMS: Relational Database Management System
RLS: Relational Learning System
RIDE: Relational Inductive Engine
RIE: Relational Inference Engine
RKB: Relational Knowledge Base
RKBS: Relational Knowledge-Based System
RR: Response Relation
TE: Transfer Engine

I claim:

1. A relational artificial intelligence system in a digital computer performing automatic knowledge acquisition from a set of data records, generating a set of relational knowledge bases through the aid of a set of CPUs of said computer, and performing inferences on said set of relational knowledge bases to obtain inference results based on a set of required data, comprising:

input/output means for acquiring data and generating output;

computer storing means for storing data and computer programs;

a set of relational inductive engines being a set of executable computer programs stored in said computer storing means for automatically discovering knowledge from said set of data records and generating said set of relational knowledge bases through the aid of said set of CPUs of said computer, each one of said relational knowledge bases comprising a set of knowledge relations; and a set of relational inference engines being a set of executable computer programs stored in said computer storing means for reasoning about said set of relational knowledge bases and obtaining stud inference results based on said set of required data means for storing all permissible values in fields of each attribute of said decision relations in said computer storing means; means for assigning a code to each one of said permissible values; means for translating said permissible values to code; means for creating a set of code decision relations; and means for translating said code to said permissible values;

wherein

A. said set of relational inductive engines comprising:
   a. means for acquiring data from said set of data records through said input/output means;
   b. means for selecting a set of value-attributes and a set of decision-attributes from all attributes of said set of data records;
   c. means for creating a set of decision relations in said computer storing means, each one of said decision relations comprising said set of value-attributes, said set of decision-attributes, and more than one record selected from said set of data records;
   d. means for clustering tuples in each one of said set of decision relations into positive instances and negative instances;
   e. means for counting positive counts of said positive instances and negative counts of said negative instances in each one of said set of decision relations;
   f. means for conjunctive generalization comprising means for generalizing values in value-fields in each of said set of decision relations; and
   g. means for generating said set of relational knowledge bases in said computer storing means, each of said relational knowledge bases comprising a set of knowledge relations;

B. said set of relational inference engines comprising:
   a. means for scanning all value-fields in each one of said set of knowledge relations of said set of relational knowledge bases generated by said set of relational inductive engines in said computer storing means;
   b. means for accepting said required data for said value-attributes;
   c. means for comparing said required data with values in said value-fields and performing true-false tests for said value-fields;
   d. means for tuple testing, for performing true-false tests of status factors of tuples of each one of said knowledge relations;
   e. means for determining a set of tuples with true status factors; and
   f. means for executing decision statements in said set of tuples through said input/output means.

2. The relational artificial intelligence system of claim 1 wherein said set of data records is a database relation of a database system.

3. A relational learning system in a digital computer for automatically discovering knowledge from a set of data records and generating a set of relational knowledge bases through the aid of a set of CPUs of said computer, comprising:

input/output means for obtaining data and generating output;

computer storing means for storing data and computer programs;

a set of relational inductive engines being a set of executable computer programs for automatically discovering knowledge from said set of data records and generating said set of relational knowledge bases through the aid of said set of CPUs of said computer, each of said relational knowledge bases comprising a set of knowledge relations, comprising:

means for acquiring data from said set of data records through said input/output means;

means for selecting a set of value-attributes and a set of decision-attributes from all attributes of said set of data records;

means for creating a set of decision relations in said computer storing means, each of said decision relations comprising said set of value-attributes, said set of decision-attributes, and more than one record selected from said set of data records;

means for clustering tuples in each one of said set of decision relations into positive instances and negative instances;

means for counting positive counts of said positive instances and negative counts of said negative instances in each one of said decision relations;

means for conjunctive generalization comprising means for generalizing values in value-fields in each one of said set of decision relations; and means for generating said set of knowledge relations in said set of relational knowledge bases in said computer storing means from said decision relations; means for storing all permissible values of each attribute of said decision relations in said computer storing means; means for assigning code to said permissible values; means for translating said permissible values to said code; means for creating a set of code decision relations; and means for translating said code to said permissible values.

4. The relational learning system of claim 3 wherein said set of data records is a database relation of a database system.

5. A relational knowledge-based system in a digital computer, comprising:

input/output means for obtaining data and generating output;

computer storing means for storing data and computer programs, means for storing all permissible values of each attribute of said decision relations in said computer storing means; means for assigning code to said permissible values; means for translating said permissible values to said code; means for creating a set of code decision relations; and means for translating said code to said permissible values;

a set of relational knowledge bases, each of said relational knowledge bases comprising a set of knowledge relations entered by said input/output means and stored in said computer storing means, each of said knowledge relations comprising a set of attributes and a set of tuples, said set of attributes comprising a subset of value-attributes and a subset of decision-attributes, intersections of said value-attributes and said tuples being called value-fields, each of said value-fields storing a value and having a status factor, and intersections of said decision-attributes and said tuples being called decision-fields, values stored in said decision-fields being decision statements;

a set of relational inference engines being a set of executable computer programs stored in said computer storing means for reasoning about said set of knowledge relations and generating a set of inference results, comprising:

means for scanning said value-fields in each one of said set of knowledge relations of said set of relational knowledge bases in said computer storing means;

means for accepting, for accepting required data for value-attributes;

means for comparing said required data with values in said value-fields and performing true-false tests for said value-fields;

means for tuple testing, for performing true-false tests of status factors of tuples in each one of said knowledge relations;

means for determining a set of tuples with true status factors; and means for executing said decision statements in said set of tuples through said input/output means.

6. The relational knowledge-based system of claim 5 further comprises means for storing said required data in said computer storing means.

7. The required data of claim 6 are fed from outside said relational knowledge-based system into said computer storing means directly.

8. The set of inference engines of claim 5 further comprises means for querying environments of said relational knowledge-based system to obtain said required data.

\* \* \* \* \*

UNITED STATES PATENT AND TRADEMARK OFFICE
CERTIFICATE OF CORRECTION

PATENT NO. : 5,473,732                          Page 1 of 2
DATED : December 5, 1995
INVENTOR(S) : Hou-Mei Henry Chang It is certified that error appears in the above-indentified patent and that said Letters Patent is hereby corrected as shown below:

Column 12, line 7, replace "stud" with -- said --.

Column 12, line 10, replace "decision" with -- knowledge --.

Column 12, line 13, replace the first "code" with -- codes--.

Column 12, line 14, replace "decision" with -- knowledge --

Column 12, line 14, replace "code" with -- codes --.

Column 12, line 39, replace "a" with -- said --.

Column 12, line 60, replace "a database relation" with -- a set of database relations --.

Column 13, line 31, replace ";" with -- . --.

Column 13, cancel line 32 through line 38.

Column 13, line 40, replace "a database relation" with -- a set of database relations --.

Column 13, line 48, replace "said decision" with -- knowledge --.

Column 14, line 1, replace "code" with -- codes --.

Column 14, line 3, replace "code" with -- codes --.

Column 14, line 4, replace "decision" with -- knowledge --.

Column 14, line 5, replace "code" with -- codes --.

Column 14, line 18, after "statements;", insert -- and --.

UNITED STATES PATENT AND TRADEMARK OFFICE
CERTIFICATE OF CORRECTION

PATENT NO. : 5,473,732

DATED : December 5, 1995

INVENTOR(S) : Hou-Mei Henry Chang

It is certified that error appears in the above-indentified patent and that said Letters Patent is hereby corrected as shown below:

Column 14, line 28, before the first word "value" insert -- said --.

Column 14, line 33, before "tuples" insert -- said --.

Column 14, line 35, replace "a" with -- said --.

Signed and Sealed this

Fourteenth Day of May, 1996

*Attest:*

BRUCE LEHMAN

*Attesting Officer*     *Commissioner of Patents and Trademarks*